(12) United States Patent
Tian

(10) Patent No.: US 9,042,649 B2
(45) Date of Patent: May 26, 2015

(54) COLOR DOCUMENT IMAGE SEGMENTATION AND BINARIZATION USING AUTOMATIC INPAINTING

(71) Applicant: KONICA MINOLTA LABORATORY U.S.A., INC., San Mateo, CA (US)

(72) Inventor: Yibin Tian, Menlo Park, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 57 days.

(21) Appl. No.: 14/035,855

(22) Filed: Sep. 24, 2013

(65) Prior Publication Data

US 2015/0086112 A1     Mar. 26, 2015

(51) Int. Cl.
    *G06K 9/00*     (2006.01)
    *G06T 7/00*     (2006.01)

(52) U.S. Cl.
    CPC .......... *G06T 7/0081* (2013.01); *G06K 9/00442* (2013.01)

(58) Field of Classification Search
    None
    See application file for complete search history.

(56) References Cited

U.S. PATENT DOCUMENTS

| | | | |
|---|---|---|---|
| 7,146,059 B1 | 12/2006 | Durand et al. | |
| 2008/0123945 A1* | 5/2008 | Andrew et al. | 382/164 |
| 2010/0128789 A1* | 5/2010 | Sole et al. | 375/240.16 |
| 2011/0013028 A1* | 1/2011 | Zhou et al. | 348/208.6 |
| 2011/0123113 A1* | 5/2011 | Berretty et al. | 382/173 |
| 2012/0001902 A1* | 1/2012 | Lee et al. | 345/419 |
| 2012/0114225 A1* | 5/2012 | Lim et al. | 382/154 |

OTHER PUBLICATIONS

Perona et al., "Scale-space and edge detection using anisotropic diffusion", IEEE Transaction on Pattern Analysis and Machine Intelligence, vol. 12, No. 7, pp. 629-639, Jul. 1990.
Bertalmio, "Strong-continuation, contrast-invariant inpaiting with a third-order optimal PDE", IEEE Transaction on Image Processing, vol. 15, No. 7, p. 1934-1938, Jul. 2006.
Bertalmio et al., "Image Inpainting", Proceedings of SIGGRAPH 2000, pp. 1-8, New Orleans, USA, Jul. 2000.
Criminisi et al., "Object Removal by Exemplar-Based Inpainting", Proceedings of the IEEE Conference on Computer Vision and Pattern Recognition, pp. 1-8, 2003.
Grigorescu et al., "Comparison of texture features based on Gabor filters", IEEE Transactions on Image Processing, vol. 11, No. 10, pp. 1160-1167, Oct. 2002.

* cited by examiner

*Primary Examiner* — Phuoc Tran
(74) *Attorney, Agent, or Firm* — Chen Yoshimura LLP

(57) ABSTRACT

A method for separating foreground and background contents in a document image is provided. The method first computes a pixel-wise map of maximal local features (e.g., local variance, local contrast, etc.), which is binarized to generate a mask for potential foreground. In order to utilize color information effectively, the local feature map is computed using all color channels of the image. Then the background image is obtained by inpainting the mask regions from the non-mask regions of the original document image. Adaptive thresholding is applied to the difference between the original document image and the background image to obtain the binary foreground image. Post-processing of the binary foreground image can further remove undesirable elements. Finally, a more accurate background image can be obtained by inpainting the original document image using the binary foreground image as a mask.

18 Claims, 6 Drawing Sheets

Lots of Help

- Viz/data: Large scale performance/behavior visualization
  - Current tools scale badly
  - Discrete data visualization as opposed to continuous fields
  - Relate program, performance data, compiler decisions...
- Interoperability/portability – CCA ideas could be expanded to provide semantic information across interfaces, including performance information to support global resource management
  - Ways to express component semantics so as to support composition
  - CCA component ideas applied to infrastructure components as well as application components: e.g. compilers, debuggers

Fig. 2D

Lots of Help

- Viz/data: Large scale performance/behavior visualization
  - Current tools scale badly
  - Discrete data visualization as opposed to continuous fields
  - Relate program, performance data, compiler decisions...
- Interoperability/portability – CCA ideas could be expanded to provide semantic information across interfaces, including performance information to support global resource management
  - Ways to express component semantics so as to support composition
  - CCA component ideas applied to infrastructure components as well as application components: e.g. compilers, debuggers

Fig. 2E

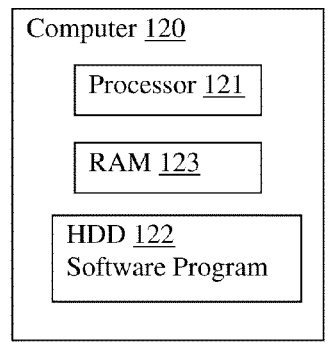

Fig. 3

COLOR DOCUMENT IMAGE SEGMENTATION AND BINARIZATION USING AUTOMATIC INPAINTING

BACKGROUND OF THE INVENTION

1. Field of the Invention

This invention relates to document image processing, and in particular, it relates to separation (segmentation) of foreground text and background graphics or image.

2. Description of Related Art

Some document images contains both foreground (typically, text) and background (typically, graphics or image) content. Examples includes a PowerPoint document that has a "theme" graphic as background and text as foreground, a table or spreadsheet with shaded table cells, a check with a background image, etc. Sometimes, background may result from undesirable artifacts during image acquisition, such as uneven lighting condition when a document image is generated by photographing a hardcopy document. Typically, the background graphics or image is slow-varying as compared to the foreground text. Color document images can have various complex foreground and background conditions. For various purposes, such as document binarization, OCR (optical character recognition), printing, etc., it is often desirable to automatically separate the foreground text from the background image of graphics.

Existing methods for color document image binarization usually convert a color image into grayscale and then apply certain global or local (adaptive) thresholding to obtain a binary output, with the goal of excluding the background image or graphics from the binarized document.

SUMMARY

The present invention is directed to a method and related apparatus for separating foreground and background content.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for processing a document image containing background content and foreground content, which includes: (a) generating a foreground mask which is a binary map indicating areas of the document image that contain high values of local features; (b) inpainting the document image in areas indicated by the foreground mask to generate a background map; (c) calculating a difference image between the document image and the background image; and (d) binarizing the difference image to generate a binary foreground image.

Step (a) may include: (a1) for each pixel of the document image, computing a maximal local feature value within a local window, to generate a maximal local feature map; and (a2) binarizing the maximal local feature map to generate the foreground mask. The local feature value may be a local variance, a local contrast, a local gradient, or a local phase congruency.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 2A-2D illustrate an example of foreground and background separation using a method according to an embodiment of the present invention. FIG. 2A shows an input color document image containing foreground text and background graphics. FIG. 2B is a binary mask. FIG. 2C is the background image generated by inpainting using the original color image and the mask of FIG. 2B. FIG. 2D is the grayscale difference between the original color image and the background. FIG. 2E is the binary foreground image.

FIG. 3 schematically illustrates a data processing apparatus in which embodiments of the present invention may be implemented.

DETAILED DESCRIPTION OF PREFERRED EMBODIMENTS

Embodiments of the present invention provide a method for separating foreground and background contents in a document image. The method first computes a pixel-wise map of maximal local feature (e.g., local variance, local contrast, local texture, etc.), which is binarized to generate a mask for potential foreground. In order to utilize color information effectively, the local variance, contrast or texture map is computed using all color channels of the image. Then the background image is obtained by inpainting the mask regions from the non-mask regions of the original document image. Afterwards, adaptive thresholding is applied to the difference between the original document image and the background image to obtain the binary foreground image. Post-processing of the binary foreground image can further remove undesirable elements. Finally, a more accurate background image can be obtained by inpainting the original document image using the binary foreground image as a mask.

Figure 1:
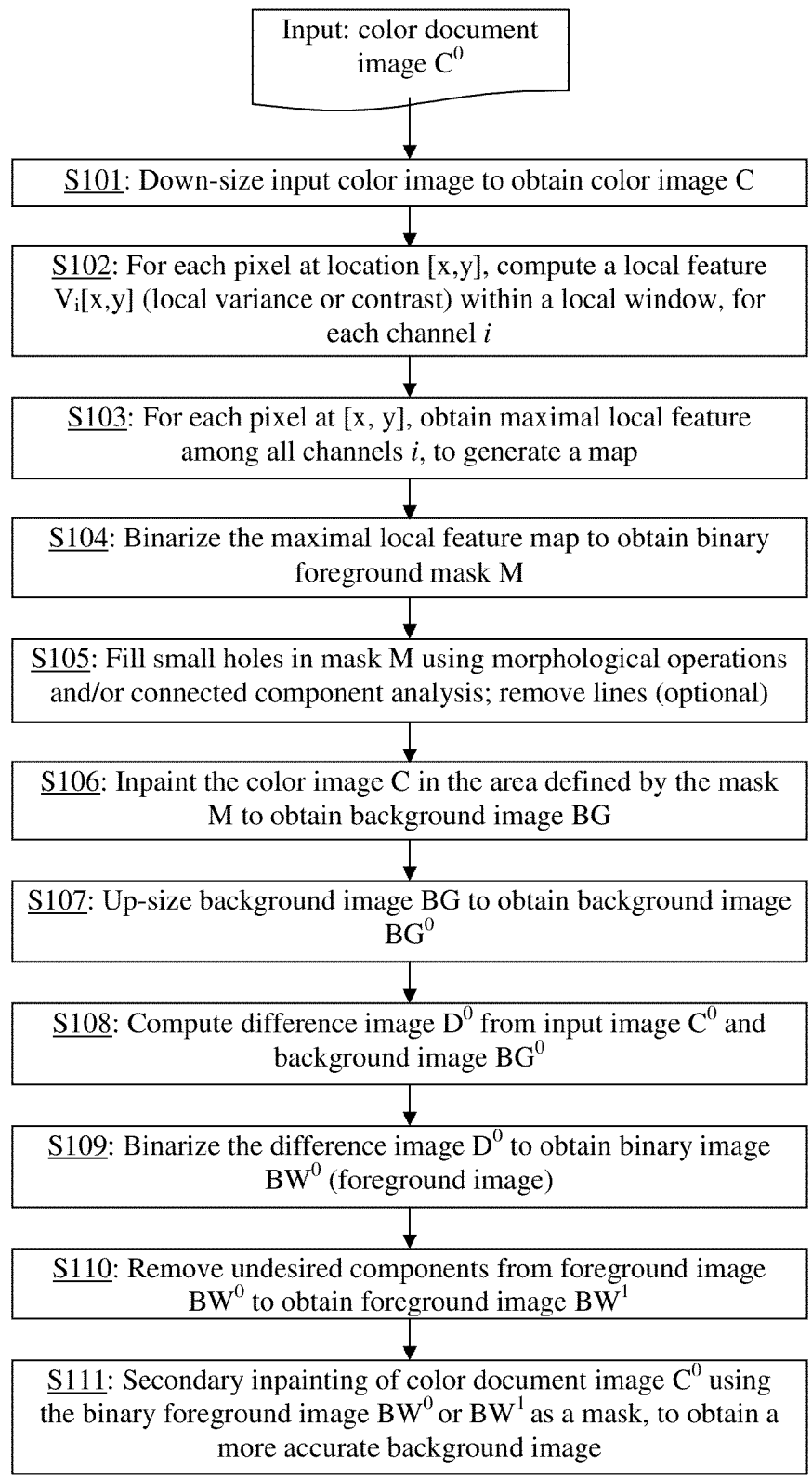
FIG. 1 schematically illustrates a method for separating background and foreground content according to an embodiment of the present invention.

A background separation process according to an embodiment of the present invention is described in detail with reference to FIG. 1. The input to the process is a color document image $C^0$, which may be obtained by, for example, scanning or photographing a hardcopy document. The process can be applied to a grayscale image as well.

In an optional step S101, the input image $C^0$ is down-sized by a desired scale to generate a resized image C. A main purpose of down-sizing (i.e. resizing to a smaller size) is to generate a smaller image to speed up the computation. In addition, an optional de-noising step (not shown in FIG. 1) may be performed before or after down-sizing. De-noising is preferably carried out using an edge-preserving filtering method, such as bilateral filtering (U.S. Pat. No. 7,146,059), or anisotropic diffusion (Perona P and Malik J, "Scale-space and edge detection using anisotropic diffusion", IEEE Transaction on Pattern Analysis and Machine Intelligence, vol. 12, pp. 629-639, 1990).

Then, for each image pixel at location [x,y], a local feature $V_i[x,y]$ within a local window is computed for each data channel i (step S102). A data channel may refer to a color channel of the image and/or other channel of information. In other words, the number of channels is the number of values assigned to each image pixel. In common color image formats, a color image may have three channels (for example, in an RGB color space), or more than three channels (for example, in a CMYK color space). The input image can also be in hybrid image format, such as RGBD, where D is depth, in which case a proper normalization of the pixel values in each channel is carried out (for example, all channels normalized to be between 0 and 1). Also, if the input image is a grayscale image, it has only one channel.

The local window is a window centered on the pixel location [x,y], and may have a size of N×N pixels, for example, 7 by 7, 9 by 9, 11 by 11 pixels, etc. The local feature is preferably a local variance, a local contrast or a local texture; other suitable local features such as gradient, phase congruency, etc. may be used, but they tend to demand significantly more computation. Variance may be calculated using the standard statistical definition of variance. Contrast may be computed in different ways; the simplest form is Michelson contrast:

$$\text{Contrast} = \frac{\max(I) - \min(I)}{\max(I) + \min(I)}$$

where I is the local window of N×N image pixels. A more sophisticated contrast can be computed based on histogram using percentiles:

$$\text{Contrast} = \text{Percentile}^{pu}(I) - \text{Percentile}^{pl}(I)$$

where pu and pl are the upper and lower percentiles. For example, pu=0.95, pl=0.05. This makes the computed local contrast more robust to the disturbance of noise. Texture can be computed in a number of ways; a very popular approach is based on Gabor filters (see Grigorescu S, Petkov N and Kruizinga P, "Comparison of texture features based on Gabor filters", IEEE Transactions on Image Processing, Vol. 11, pp. 1160-1167, 2002).

For each pixel at [x,y], a maximal local feature value among all channels i is obtained (step S103). This results in a map $V_{max}[x,y]$ (maximal local feature map) which is of the same size as the color image C. Then, the maximal local feature map $V_{max}[x,y]$ is binarized to obtain a binary map M (step S104), which will be used as a foreground mask in the inpainting step later. The binarization step S104 may use any suitable binarization method, either a global binarization method or a local binarization method.

More generally, steps S102 to S104 constitute a step of generating a foreground mask, which is a binary map indicating areas of the document image that contain high values of local features. In one example, the pixels in areas having high values of local feature have a non-zero value (e.g. 1) in the foreground mask M, and other pixels have a zero value. The areas having high values of local feature are areas to be inpainted.

Preferably, a step is performed to fill in small holes in the foreground mask M (step S105, optional). For examples, holes smaller than about 3 pixels across should be filled. This may be performed, for example, by using morphological operations (e.g. dilation and erosion). Step S105 may also include removing table lines and other lines, which may be done by using connected component analysis, Hough transform, or combination of two, or other suitable methods. If table lines are removed at this state, i.e. they are not a part of the foreground mask, they will be separated as a part of the background instead of the foreground.

In certain situations, for example, when a foreground text character is large and bold, for example, when the thickness of the character stroke is similar to the size of the local window, the foreground mask K may be hollow inside the character strokes. In other words, a large bold character may be represented in the foreground mask M as an outline of the character. For example, a large, bold character "O" may become two circles in the mask M. It can be difficult to fill the hollow part between the two circles using dilation and erosion as aggressive dilation and erosion may lead to undesirable distortions of other small characters. To deal with this problem, connected components of the mask M are obtained, and a convex hull of each connected component is found. The convex hulls of all connected components form the mask M. Thus, for example, for a large, bold character "O", the convex hull is a solid shape (e.g. polygon) that bounds the character with no hollow interior. A tradeoff is that the if the character has a hole inside, like the character "O", then the inside area (not covered by the character) now becomes a part of the mask and will be inpainted. This should be acceptable since the background is expected to be slow varying.

Then, the color image C (either the input image or the down-sized image if step S101 is performed) is inpainted in the area defined by the foreground mask M to obtain a background image BG (step S106). Inpainting is a well known technique in photography and other fields, used to restore or repair images in areas that involve damages or other defects, to replace objects, etc. It reconstructs pixels in the designated area (as defined by a mask) using information from surrounding pixels. Any suitable inpainting method may be used in step S106, though the preferred embodiment should preserve the continuation of dominant structures (such as lines) and image contrast (see Bertalmio M, "Strong-continuation, contrast-invariant inpaiting with a third-order optimal PDE", IEEE Transaction on Image Processing, Vol. 15, p. 1934-1938, 2006). The background image generated by step S106 is approximately what the background image would have been if the foreground image were not present.

In one implementation, step S106 is performed by first modifying the color image C by assigning a unique color value to all pixels that correspond to a non-zero pixel in the foreground mask M. In other words, for every non-zero pixel in mask M at [x,y], a pixel [x,y] in the color image C is set to a unique color. The unique color is a color that is different from any color in the color image C. This unique color may be found by examining the pixel color values (for all color channels, e.g. R, G, B) of the image C. Alternatively, it is often the case that the pure black color is not present in any pixel of a color image (often, even very dark pixels do not have pure black values), so the pure black color can be used as the unique color in this step. Then, inpainting is performed on the modified color image by inpainting pixels that have this unique color using surrounding pixels. An advantage of this implementation is that the inpainting computation only needs to have one image (the modified color image) as input, rather than requiring both a color image and a mask.

If the input color image $C^0$ was down-sized in step S101, an up-sizing step S107 is performed now to up-size (i.e. resize to a larger size) the background image BG by the same scaling factor that was used in step S101, so that the up-sized background image $BG^0$ has the same size as the input image $C^0$.

Next, a difference image $D^0$ is computed from the input image $C^0$ and the up-sized background image $BG^0$, using pixel-wise subtraction (step S108). The difference image $D^0$ is then binarized to obtain a binary image $BW^0$, which is representative of the foreground content, and is referred to as the foreground image (step S109). The binarization step may use any suitable binarization method, either a global binarization method or a local binarization method.

Optionally, a cleaning step (step S110) may be carried out to remove undesired components in the binary foreground image $BW^0$, using morphological operations and/or connected component analysis or other suitable methods. For example, undesired components may include noise, which may be removed using morphological operations; unwanted lines such as table lines, which may be identified using connected component analysis or other methods and removed; etc. A "clean" foreground image $BW^1$ is generated as a result.

If the background image itself is desired as an output image, a second inpainting step may be performed on the original color image $C^0$, using the binary foreground image from step S109 or S110 as a mask (step S111, optional). The same inpainting procedure as in step S106 may be used. The background image obtained this way is closer to the actual background image.

Figure 2A:
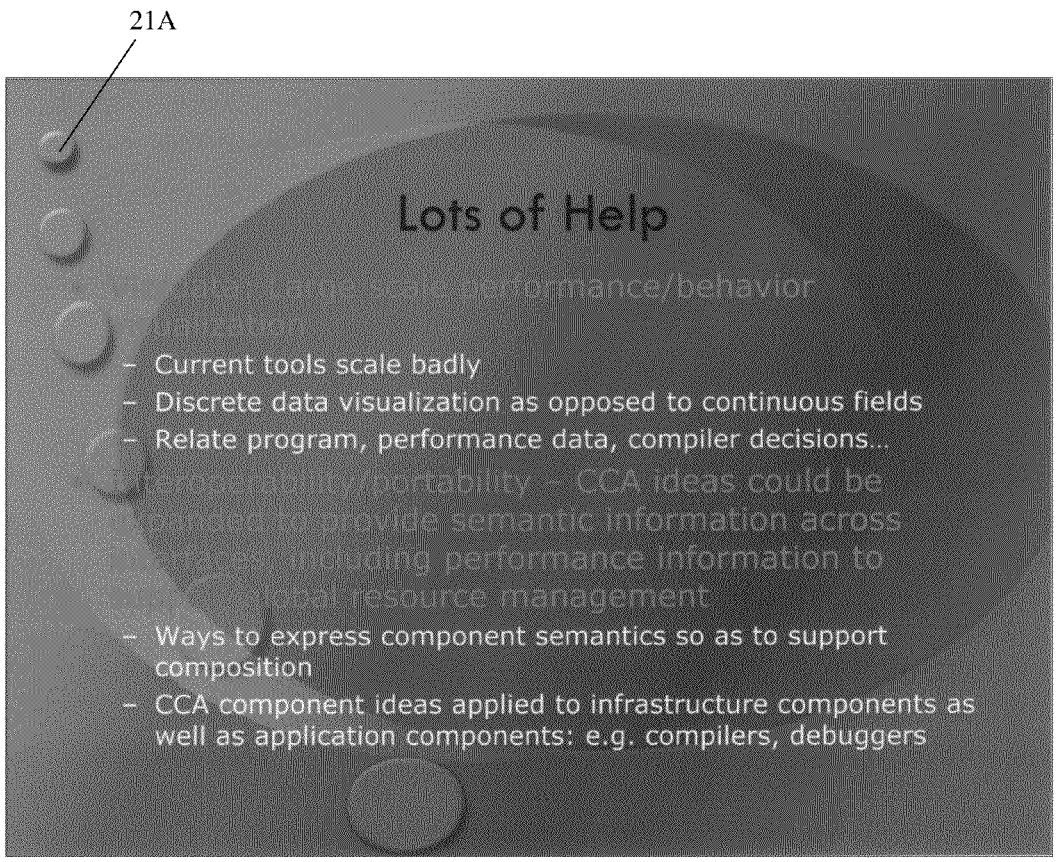
Figure 2B:
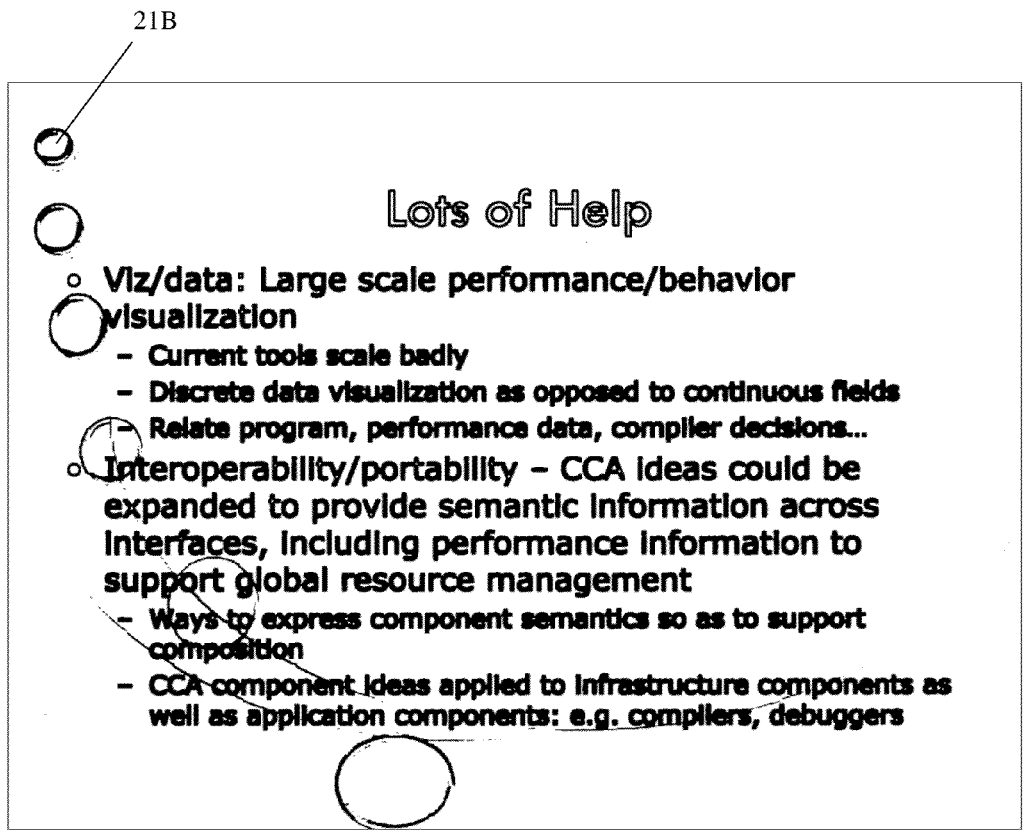
Figure 2C:
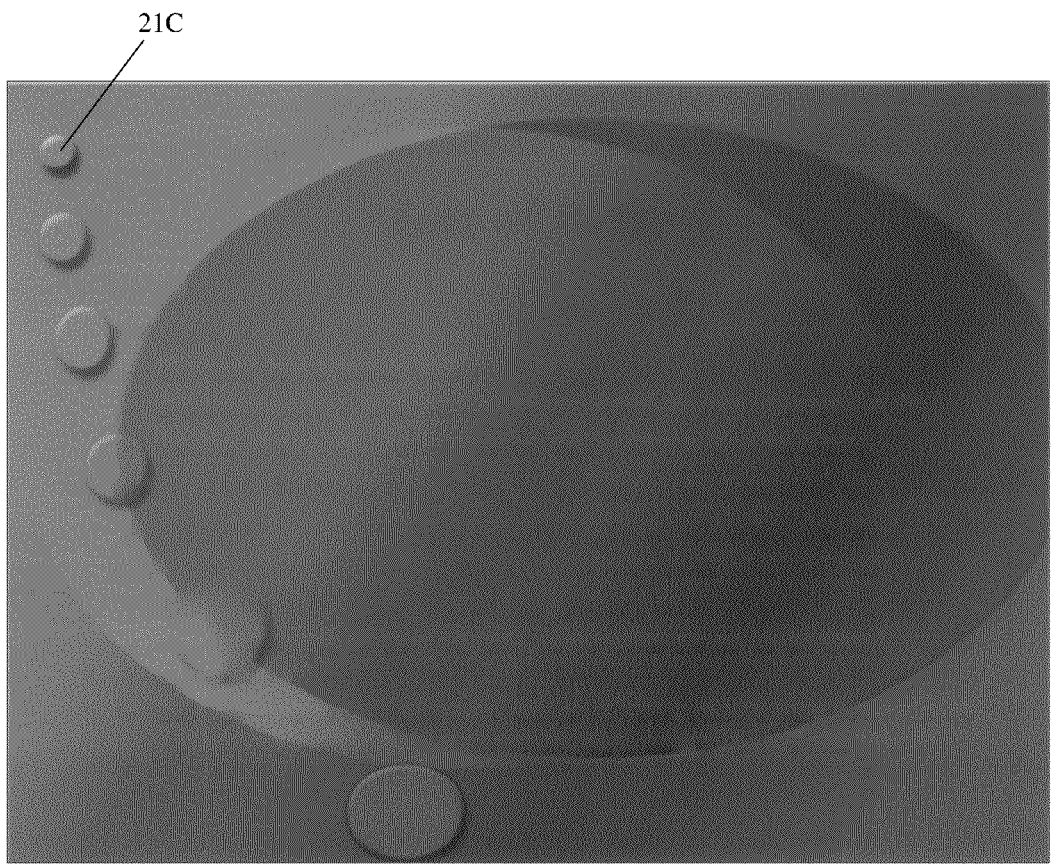

FIGS. 2A-2E illustrate an example of foreground and background separation using the method described above. FIG. 2A shows an input color document image containing foreground text and background graphics. In this example, note that some foreground text has a lighter color than the local background, some has a darker color, and some has a color of similar intensity as but different hue than the local background. FIG. 2B shows the foreground mask computed from step S104. FIG. 2C shows the background image generated by inpainting (step S106) using the original color image FIG. 2A and the mask of FIG. 2B. FIG. 2D shows the difference image between input color image FIG. 2A and inpainted background image FIG. 2C (it has been converted to grayscale in this example). FIG. 2E shows the binary foreground image obtained in step S109. Note that FIG. 2E is shown as black text on white background, but it may also be shown as white text on black image.

It can be seen that the foreground mask (FIG. 2B) has components that correspond to the foreground text, but the lines are thicker than in the text; it also contains components formed by sharper (higher frequency) features in the background image, such as some circles 21B resulting from the red disks 21A in the original image (FIG. 2A) and some arcs. After inpainting, the edges of some red disks 21C become somewhat fuzzy (see FIG. 2C, e.g. the fifth red disk from the top), but this only results in insignificant noise in the difference image (see FIG. 2D), which are eliminated by the binarization step S109 (see FIG. 2E).

To summarize, the above-described background and foreground separation method has at least two main features. First, inpainting is used to find the background of a document image, and the area to be inpainted (the foreground mask) is automatically extracted from the document image. This is different from existing inpainting methods, used for image restoration and repair, object replacement, etc., where the area to be inpainted is manually marked. Second, to extract the foreground mask, color information is utilized such that the most dominant local measure (local variance, local contrast, or other more sophisticated measures) in one of the color channels is obtained to generate the mask.

The above described method has many advantages. First, color information is better utilized to separate foreground and background where their grayscale value difference may be small. Second, it can effectively handle complex background color combinations, such as interleaving colors or gradual varying colors. Third, it can effectively handle different foreground-background polarities ("white-on-black" and "black-on-white") using the same algorithm. Fourth, the identification of the inpainting region is fully automatic. Fifth, complete background information can be obtained, which can be useful in other applications such as layout analysis, document authentication, and so on.

The background and foreground separation method described here can be implemented in a data processing system such as a computer 120 as shown in FIG. 3. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

It will be apparent to those skilled in the art that various modification and variations can be made in the background and foreground separation method and related apparatus of the present invention without departing from the spirit or scope of the invention. Thus, it is intended that the present invention cover modifications and variations that come within the scope of the appended claims and their equivalents.

What is claimed is:

1. A method for processing a document image containing background content and foreground content, comprising:
    (a) generating a foreground mask which is a binary map indicating areas of the document image that contain high values of local features;
    (b) inpainting the document image in areas indicated by the foreground mask to generate a background map;
    (c) calculating a difference image between the document image and the background image; and
    (d) binarizing the difference image to generate a binary foreground image.

2. The method of claim 1, wherein step (a) comprises:
    (a1) for each pixel of the document image, computing a maximal local feature value within a local window, to generate a maximal local feature map; and
    (a2) binarizing the maximal local feature map to generate the foreground mask.

3. The method of claim 2, wherein the document image is a color image, wherein each pixel of the document image has one or more pixel values corresponding to one or more data channels, wherein step (a1) comprises, for each pixel of the document image:
    computing a local feature value within the local window for each of the one or more data channels;
    wherein the maximal local feature value is a maximal one among the local feature values of all of the one or more data channels.

4. The method of claim 3, wherein the local feature value is a local variance, a local contrast, a local texture, a local gradient, or a local phase congruency.

5. The method of claim 2, wherein step (a) further comprises, after step (a2):
    filling holes in the foreground mask.

6. The method of claim 2, wherein step (a) further comprises, after step (a2):
    removing undesired components including noise and lines from the foreground mask.

7. The method of claim 1, further comprising:
    before step (a), down-sizing the document image by a scaling factor, wherein steps (a) and (b) are performed using the down-sized document image; and
    after step (b) and before step (c), up-sizing the background image by the scaling factor, wherein step (c) is performed using the document image before down-sizing and the up-sized background image.

8. The method of claim 1, further comprising, after step (d):
    (e) removing undesired components including noise and lines from the binary foreground image.

9. The method of claim 1, further comprising, after step (d):
using the binary foreground image generated in step (d) as a second mask, inpainting the document image in areas indicated by the second mask.

10. A computer program product comprising a computer usable non-transitory medium having a computer readable program code embedded therein for controlling a data processing apparatus, the computer readable program code configured to cause the data processing apparatus to execute a process for processing a document image containing background content and foreground content, the process comprising:
(a) generating a foreground mask which is a binary map indicating areas of the document image that contain high values of local features;
(b) inpainting the document image in areas indicated by the foreground mask to generate a background map;
(c) calculating a difference image between the document image and the background image; and
(d) binarizing the difference image to generate a binary foreground image.

11. The computer program product of claim 10, wherein step (a) comprises:
(a1) for each pixel of the document image, computing a maximal local feature value within a local window, to generate a maximal local feature map; and
(a2) binarizing the maximal local feature map to generate the foreground mask.

12. The computer program product of claim 11, wherein the document image is a color image, wherein each pixel of the document image has one or more pixel values corresponding to one or more data channels, wherein step (a1) comprises, for each pixel of the document image:
computing a local feature value within the local window for each of the one or more data channels;
wherein the maximal local feature value is a maximal one among the local feature values of all of the one or more data channels.

13. The computer program product of claim 12, wherein the local feature value is a local variance, a local contrast, a local texture, a local gradient, or a local phase congruency.

14. The computer program product of claim 11, wherein step (a) further comprises, after step (a2):
filling holes in the foreground mask.

15. The computer program product of claim 11, wherein step (a) further comprises, after step (a2):
removing undesired components including noise and lines from the foreground mask.

16. The computer program product of claim 10, wherein the process further comprises:
before step (a), down-sizing the document image by a scaling factor, wherein steps (a) and (b) are performed using the down-sized document image; and
after step (b) and before step (c), up-sizing the background image by the scaling factor, wherein step (c) is performed using the document image before down-sizing and the up-sized background image.

17. The computer program product of claim 10, wherein the process further comprises, after step (d):
(e) removing undesired components including noise and lines from the binary foreground image.

18. The computer program product of claim 10, wherein the process further comprises, after step (d):
using the binary foreground image generated in step (d) as a second mask, inpainting the document image in areas indicated by the second mask.

* * * * *